United States Patent [19]

Amer

[11] Patent Number: 4,834,990
[45] Date of Patent: May 30, 1989

[54] NON-DAIRY LIQUID HEALTH FOOD

[76] Inventor: Moh. S. Amer, 3177 Padero La., Carpenteria, Calif. 93013

[21] Appl. No.: 137,200

[22] Filed: Dec. 23, 1987

[51] Int. Cl.$^4$ ................................................ A23L 2/00
[52] U.S. Cl. ..................................... 426/74; 426/590; 426/599; 426/804
[58] Field of Search .................. 426/804, 599, 74, 590, 426/658, 93, 575

[56] References Cited

U.S. PATENT DOCUMENTS

| 4,160,849 | 7/1979 | Hachette et al. | 426/599 |
| 4,163,807 | 8/1979 | Jackman | 426/599 |
| 4,388,330 | 6/1983 | Wobben et al. | 426/330.5 |
| 4,433,000 | 2/1984 | De Leon | 426/599 |
| 4,690,827 | 9/1987 | Kupper | 426/599 |
| 4,722,847 | 2/1988 | Heckert | 426/74 |

FOREIGN PATENT DOCUMENTS

| 0108594 | 5/1984 | European Pat. Off. | 426/599 |
| 59-82072 | 5/1984 | Japan | 426/599 |

Primary Examiner—Donald E. Czaja
Assistant Examiner—Carolyn Paden
Attorney, Agent, or Firm—Samson B. Leavitt; Michael A. Leavitt

[57] ABSTRACT

An improved non-dairy liquid food product is made by adding dietary fiber and calcium to a fruit juice or a drink. The dietary fiber may include soluble, insoluble dietary fiber or mixtrues there of. Any soluble, insoluble, organic or inorganic calcium salt may be employed.

10 Claims, No Drawings

NON-DAIRY LIQUID HEALTH FOOD

FIELD OF THE INVENTION

This invention relates to improved non-dairy liquid food products such as fruit juices or drinks or other non-dairy liquids containing significant amounts of dietary fiber and desirably calcium. The invention is especially concerned with the inclusion of both soluble and insoluble forms of dietary fiber and desirably calcium salts or drinkable juices or drinks or other non-dairy fluids without imparting significant negative taste, texture or color to the liquids.

BACKGROUND TO THE INVENTION

Dietary fiber and calcium are known to be valuable in the maintenance of good heath. Dietary fiber is regarded as important in reducing irregularity and prevention of colon irritation and colon cancer. The soluble forms of dietary fiber have been further implicated in lower blood cholesterol levels and in the prevention of atherosclerosis and heart disease. The importance of calcium in the maintenance of bone particularly in postmenopausal women and yound children cannot be overemphasized.

SUMMARY OF THE INVENTION

It is an object of this invention to provide non-dairy liquid food products including juices, drinks or other fluids that contain significant amounts of dietary fiber, both soluble and insoluble, and desirable calcium without significantly changing their basic characteristics in taste, color or texture. Another object of this invention is to provide fruit juices, drinks or other fluids that are stable with respect to suspension of the fiber and suitable for human consumption and contain natural materials for the most part. Still another object of the invention is to provide a process for making such a fortified fruit juice, drink or other liquid food product. Other objects and advantages will appear as the description proceeds.

DETAILED DESCRIPTION OF THE INVENTION

Typically the fruit juice, drink or other liquid food of this invention will contain about 0.5 to 10% by weight of dietary fiber of which 0-100% could be of the soluble variety. It could desirably also contain about 100-2000 mg., preferably about 300 to 1,000 mg. of elemental calcium per 8 oz. serving in the form of one or a mixture of suitable calcium salts. The selection of the specific calcium salt or mixture of such salts is determined primarily by the desired properties of the fruit juice, drink or other liquid food as regards pH, taste characteristics, clarity characteristics, cost and the desired elemental calcium content.

Any non-toxic soluble, insoluble, organic or inorganic calcium salt or salts may be employed, such as calcium lactate, calcium chloride, calcium oxide, calcium sulphate, calcium citrate, calcium ascorbate, calcium acetate, calcium gluconate, monocalcium phosphate, dicalcium phosphate, tricalcium phosphate, calcium tartarate . . . etc. .

Examples of water-insoluble dietary fiber include natural cereal, fruit, grain, celluloses and modified celluloses, such as methyl cellulose, hydroxyethyl cellulose, hydroxpyropyl cellulose, carboxymethyl cellulose and other similar modified celluloses.

Examples of water-soluble dietary fiber include plant gums and plant derivatives such as gum arabic, locust bean gum, citrus pectins, low and high methoxy pectin, gum tragacanth, agar, carrageenan, xanthan gum, guar gum, alginic acid salts, gum ghatti, Irish moss, gum karia and the like. Mixtures of soluble and insoluble dietary fiber may be employed.

It is an important feature or embodiment of this invention that to ensure a stable suspension of any insoluble dietary fiber and insoluble calcium salts about 0.1 to about 0.5 wt.% of a stabilizer mixture containing carboxymethyl cellulose (15–45%), guar gum (15–45%), locust bean gum (15–30%) and carrageenan (12.5–22.5%) is desirably used in proportion to the amount of insoluble material. Typically, the weight ratio of stabilizer:insoluble fiber and/or calcium may range from about 0.1:1 to about 1:1, preferably about 0.2:1 to about 0.5:1, but amounts of stabilizer over about 0.5–0.6 wt. % in the product tend to unduly thicken or increase the viscosity of the product and are hence preferably avoided.

In juices, drinks or other non-dairy drinkables with strong taste and color, it may be possible to use salts of calcium that have acid tastes such as calcium chloride and calcium monophosphate without significant taste impact. In cloudy juices, drinks and other drinkable liquids it is possible to use insoluble calcium salts, which are usually less expensive, such as calcium carbonate, calcium sulphate, calcium triphosphate, and use the stabilizer system to produce a stable suspension.

The above-described dietary fiber and calcium salts are conveniently added to a drinkable aqueous liquid food product such as soups, carbonated or non-carbonated natural or artificial drinks (e.g. Gator-Ade), vegetable juices (e.g. "V8"), and preferably natural fruit drinks and juices such as orange, pineapple, grape, grapefruit, lemon, lime, blueberry, strawberry, raspberry, apple juices and drinks. Such liquid food products generally contain the characteristic fruit or other solute dissolved in water which normally constitutes at least about 50%, generally at least 70% up to about 97-98% of the liquid.

The liquid food products of this invention may contain from about 0.001 to about 1% of any desired flavor and/or sweetener. Suitable natural flavors include chocolate, cocoa, vanilla, orange, lemon, lime, strawberry, blueberry, raspberry, peppermint, cinnamon and the like. Suitable sweeteners, natural and synthetic, include sucrose, maltose, glucose, sorbitol, xylitol, sodium cyclamate, perillartine, aspartame, saccharine, and the like.

A suitable method for preparing a liquid food product of this invention comprises mixing the dietary fiber and the preferred calcium salts and stabilizer system with a fraction (about 15–25%) of the total fruit juice or other aqueous liquid food until completely dispersed and soluble components dissolved. In some cases, heating may be desirable or essential to complete this step, e.g. at least up to about 180° C. for 1 to 3 minutes. The resulting mixture is then thoroughly dispersed into the remainder of the total fruit juice using a tri-blender or lightning blender till homogeneous. The final mixture is then bottled, canned or boxed and sterilized in the usual way.

Following are examples illustrative but non limitative of this invention. All parts and proportions referred to herein and in the appended claims are by weight and temperatures are in a °C. unless otherwise indicated.

EXAMPLE 1

|  | Weight % |
| --- | --- |
| Microcrystalline cellulose | 1.27% |
| Stabilizer system* | 0.5% |
| Cranapple juice | 98.23% |
| Total | 100.00% |

This exemplary formulation provides about 3 g. of insoluble dietary fiber per 8 oz. serving.

EXAMPLE 2

| Cellulose BW 400** (James River) | 1.41% |
| --- | --- |
| Calcium lactate | 0.92% |
| Stabilizer system* | 0.5% |
| Cranapple juice | 97.17% |
| Total | 100.00% |

This formulation further provides 400 mg. of elemental calcium per 8 oz. serving.

EXAMPLE 3

| Gum Arabic | 1.5% |
| --- | --- |
| Cranapple juice | 98.5% |
| Total | 100.00% |

This exemplary formulation provides about 3 g. of soluble dietary fiber per 8 oz. serving.

EXAMPLE 4

| Gum Arabic | 1.5% |
| --- | --- |
| Calcium lactate | 0.92% |
| Cranapple juice | 97.58% |
| Total | 100.00% |

This formulation further provides 400 mg. of elemental calcium per 8 oz. serving.

| *Stabilizer system consists of |  |
| --- | --- |
| Carboxymethyl cellulose | 31% |
| Guar gum | 31% |
| Locust bean gum | 22% |
| Carrageenan | 16% |

Other types of dietary fiber, calcium salts, and aqueous liquid foods such as described hereinbefore may be substituted for those employed in the foregoing examples without departing from the essential teachings of this invention.

This invention has been disclosed with respect to certain preferred embodiments and it will be understood that modifications and variations thereof obvious to those skilled in the art are to be included within the spirit and purview of this application and the scope of the appended claims.

I claim:

1. A non-dairy aqueous liquid food product containing, per 8 ounce serving, about 0.5 to about 10 wt.% of soluble dietary fiber, about 100 to about 2,000 mg. of calcium in the form of one or more insoluble salts, and about 0.1 to about 0.5 wt.% of a stabilizer system consisting essentially of, approximately by weight, 15 to 45% of carboxymethyl cellulose, 15 to 45% of guar gum, 15 to 30% of locust bean gum, and 12.5 to 22.5% of carrageenan.

2. A food product according to claim 1 wherein said aqueous liquid comprises a fruit juice or drink.

3. A food product according to claim 1 wherein the soluble dietary fiber comprises gum arabic.

4. A food product according to claim 1 wherein the stabilizer system consists essentially of, approximately by weight, 31% of carboxymethyl cellulose, 31% of guar gum, 22% of locust bean gum, and 16% of carrageenan.

5. A non-dairy aqueous liquid food product comprising a fruit juice or drink containing, per 8 ounce serving, about 0.5 to about 10 wt.% of insoluble dietary fiber, 0 to about 2,000 mg. of one or a mixture of calcium salts, and about 0.1 to about 0.5 wt.% of a stabilizer system consisting essentially of, approximately by weight, 15 to 45% of carboxymethyl cellulose, 15 to 45% of guar gum, 15 to 30% of locust bean gum, and 12.5 to 22.5% of carrageenan.

6. A food product according to claim 5 wherein the stabilizer system consists essentially of, approximately by weight, 31% of carboxymethyl cellulose, 31% of guar gum, 22% of locust bean gum, and 16% of carrageenan.

7. A food product according to claim 5 wherein the insoluble dietary fiber is cellulosic.

8. A food product according to claim 5 further containing about 100 to about 2,000 mg. of calcium in the form of one or more insoluble salts.

9. A food product according to claim 5 further containing about 100 to about 2,000 mg. of calcium in the form of one or more soluble salts.

10. A food product according to claim 9 wherein the soluble salt is calcium lactate.

* * * * *